(12) United States Patent
Annunziata

(10) Patent No.: US 7,339,589 B2
(45) Date of Patent: Mar. 4, 2008

(54) SYSTEM AND METHOD FOR VIDEO CHOREOGRAPHY

(75) Inventor: Ed Annunziata, Montara, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 1281 days.

(21) Appl. No.: 10/280,640

(22) Filed: Oct. 24, 2002

(65) Prior Publication Data

US 2004/0082381 A1    Apr. 29, 2004

(51) Int. Cl.
*G06T 13/00*    (2006.01)
(52) U.S. Cl. ...................................... 345/473
(58) Field of Classification Search ................ 345/473
See application file for complete search history.

(56) References Cited

U.S. PATENT DOCUMENTS

| | | | |
|---|---|---|---|
| 5,915,972 | A | 6/1999 | Tada |
| 5,933,150 | A | 8/1999 | Ngo et al. |
| 5,982,390 | A | 11/1999 | Stoneking et al. |
| 6,040,842 | A | 3/2000 | Wavish et al. |
| 6,058,397 | A | 5/2000 | Barrus et al. |
| 6,331,851 | B1 | 12/2001 | Suzuki et al. |

FOREIGN PATENT DOCUMENTS

| | | |
|---|---|---|
| EP | 0 472 043 A1 | 2/1992 |
| EP | 0 926 655 A1 | 6/1999 |
| EP | 0 945 849 A1 | 9/1999 |
| EP | 1 031 945 A2 | 8/2000 |
| JP | 2000-311251 | 7/2000 |
| WO | WO 98/53443 | 11/1998 |

OTHER PUBLICATIONS

Thalmann et al., "Interactive Computer Animation", 1996, Prentice Hall Europe, pp. 182-186.*
M. Nilsson, "ID3 Tag Version 2.3.0," ID3v2: The Audience is Informed, Feb. 3, 1999. Available at: http://www.id3.org/id3v2.3.0.txt.

* cited by examiner

*Primary Examiner*—Almis R. Jankus
(74) *Attorney, Agent, or Firm*—Carr & Ferrell LLP

(57) ABSTRACT

An electronic entertainment system for creating a video sequence by executing video game camera behavior based upon a video game sound file includes a memory configured to store an action event/camera behavior (AE/CB) database, game software such as an action generator module, and one or more sound files. In addition, the system includes a sound processing unit coupled to the memory for processing a selected sound file, and a processor coupled to the memory and the sound processing unit. The processor randomly selects an AE pointer and a CB pointer from the AE/CB database. Upon selection of the CB pointer and the AE pointer, the action generator executes camera behavior corresponding to the selected CB pointer to view an action event corresponding to the selected AE pointer.

24 Claims, 7 Drawing Sheets

SYSTEM AND METHOD FOR VIDEO CHOREOGRAPHY

BACKGROUND OF THE INVENTION

1. Field of the Invention

This invention relates generally to electronic entertainment systems and more particularly to a system and method for video choreography.

2. Description of the Background Art

In electronic systems, particularly entertainment and gaming systems, a user typically controls the behavior or actions of at least one character in a game program using some type of manually activated controller device. Conventional controller devices include joysticks, switches, buttons, and keyboards. Further, some gaming systems use specifically designed control devices, such as a steering wheel and pedals for driving simulations or a stick and pedals for flight simulations. Yet more advanced gaming systems may use voice controls or human movements in a virtual reality game. The controller devices, voice controls, and human movements may be used to directly or indirectly control character behavior and game action. For example, a game user may initially use voice commands to train a character or a group of characters to uniquely respond to future game situations without further user input.

Game designers typically tie together a video game's music with simultaneously occurring game action events and/or character behavior. For example, it is standard practice in the design of video games to either use the video action to drive the music, or to use the music to drive the video action. If a character is in a perilous situation, such as teetering on the edge of a precipice or suddenly confronting a hated enemy warrior, for example, the video action may drive the selection of sinister sounding music to reflect a mood associated with the current video action. Or, for example, if a character discovers a cache of weapons or other useful tools, this action of the character's discovery drives the gaming software to play cheerful sounding music.

In addition, a video game's music may drive the video game's action events. For example, a user may, upon game initialization, view preprogrammed user independent video game action segments driven by accompanying music. Generally, when music drives a video game's action events, a user has no control over the video game's characters or outcome, but instead is viewing an instructional segment of the video game designed, for example, to illustrate methods of game play to new users.

Typically, the traditional functional dependence between a game's music and video action limits game spontaneity and introduces a type of rigid, repetitiveness into game play. In a sense, a user's game experience is constrained by the standard relationships between music and video action. For example, when a character crosses a rickety bridge in a traditional game with direct character control, the game software plays the same music passage for each occurrence of the same event (e.g., the crossing of the bridge).

Therefore, there is a need for a system and method for a non-standard functional dependence between a gaming environment's music and video.

SUMMARY OF THE INVENTION

In accordance with one embodiment of the present invention, an electronic entertainment system is disclosed for choreographing a video game based upon a video game sound file. The system comprises a memory configured to store an action event/camera behavior (AE/CB) database, game software such as an action generator module, and a sound file database. In addition, the system includes a sound processing unit coupled to the memory for processing a sound file selected from the sound file database, and a processor coupled to the memory and the sound processing unit. In one embodiment of the invention, the sound file is a directors track. In another embodiment of the invention, the sound processing unit processes the sound file to generate a directors track.

In one embodiment of the invention, the directors track includes preprogrammed marker bits that are either in a "1" state or a "0" state. Each "1" state marker bit marks an emotionally critical musical event in the directors track and is associated with an AE/CB array stored in the AE/CB database. The processor is configured to process the directors track to detect "1" state marker bits and to access the AE/CB arrays corresponding to the detected marker bits. The AE/CB arrays include camera behavior (CB) pointers and action flag/AE pointer pairs. Each action flag/AE pointer pair is defined to be active or inactive, dependent upon each action flag's state.

In one embodiment of the invention, the processor randomly selects one AE pointer from the active action flag/AE pointer pairs and determines an action location (AL) in a game world. Furthermore, the processor randomly selects one CB pointer from the CB pointers. Upon selection of the CB pointer and the AE pointer, the action generator executes game software corresponding to an action event associated with the randomly selected AE pointer and located at the game world AL. In addition, the action generator executes camera behavior software located by the selected CB pointer to view the action event.

DETAILED DESCRIPTION OF THE DRAWINGS

Figure 1:
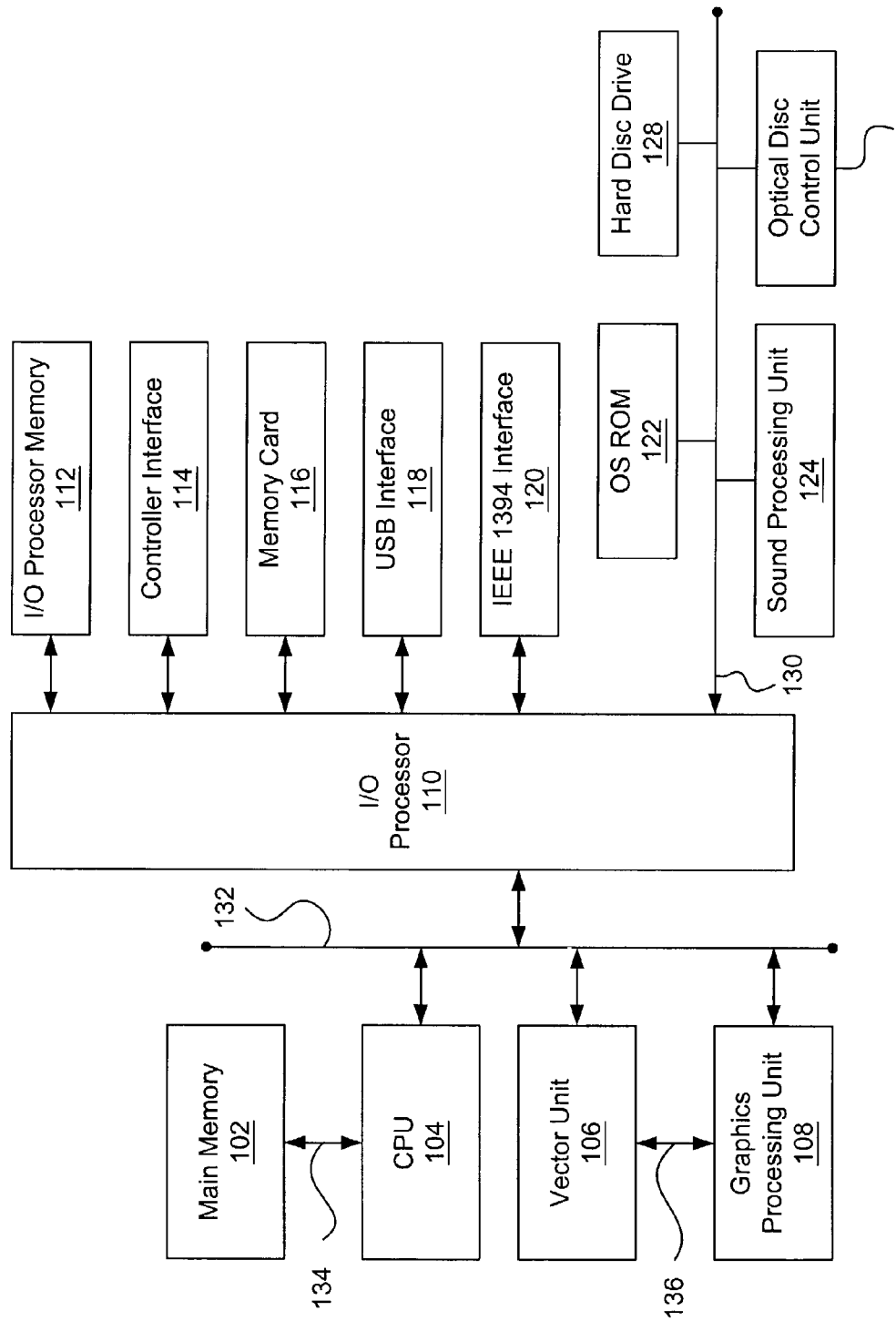
FIG. 1 is a block diagram of an exemplary electronic entertainment system, according to the present invention.

FIG. 1 is a block diagram of an exemplary electronic entertainment system 100 according to the present invention. The entertainment system 100 includes a main memory 102, a central processing unit (CPU) 104, at least one vector processing unit 106, a graphics processing unit 108, an input/output processor 110, an I/O processor memory 112, a controller interface 114, a memory card 116, a Universal Serial Bus (USB) interface 118, and an IEEE 1394 Interface 120, although other bus standards and interfaces may be utilized. The entertainment system 100 further includes an operating system read-only memory (OS ROM) 122, a sound processing unit 124, an optical disc control unit 126 and a hard disc drive 128, which are connected via a bus 130 to the I/O processor 110. Preferably, the entertainment system 100 is an electronic gaming console. Alternatively, the entertainment system 100 may be implemented as a general-purpose computer, a set-top box, or a hand-held gaming device. Further, similar entertainment systems may contain more or less operating components.

The CPU 104, the vector unit 106, the graphics processing unit 108, and the I/O processor 110 communicate via a system bus 132. Further, the CPU 104 communicates with the main memory 102 via a dedicated bus 134, while the vector unit 106 and the graphics processing unit 108 may communicate through a dedicated bus 136. The CPU 104 executes programs stored in the OS ROM 122 and the main memory 102. The main memory 102 may contain prestored programs and programs transferred through the I/O processor 110 from a CD-ROM, DVD-ROM, or other optical disc (not shown) using the optical disc control unit 126. The I/O processor 110 primarily controls data exchanges between the various devices of the entertainment system 100 including the CPU 104, the vector unit 106, the graphics processing unit 108, and the controller interface 114.

The graphics processing unit 108 executes graphics instructions received from the CPU 104 and the vector unit 106 to produce images for display on a display device (not shown). For example, the vector unit 106 may transform objects from three-dimensional coordinates to two-dimensional coordinates, and sends the two-dimensional coordinates to the graphics processing unit 108. Furthermore, the sound processing unit 124 executes instructions to produce sound signals that are outputted to an audio device such as speakers (not shown).

A user of the entertainment system 100 provides instructions via the controller interface 114 to the CPU 104. For example, the user may instruct the CPU 104 to store certain game information on the memory card 116 or instruct a character in a game to perform some specified action. Other devices may be connected to the entertainment system 100 via the USB interface 118 and the IEEE 1394 interface 120. It should be noted that FIG. 1 illustrates only one configuration of the entertainment system 100; and alternate embodiments having more or less components coupled in a different configuration are contemplated.

Figure 2:
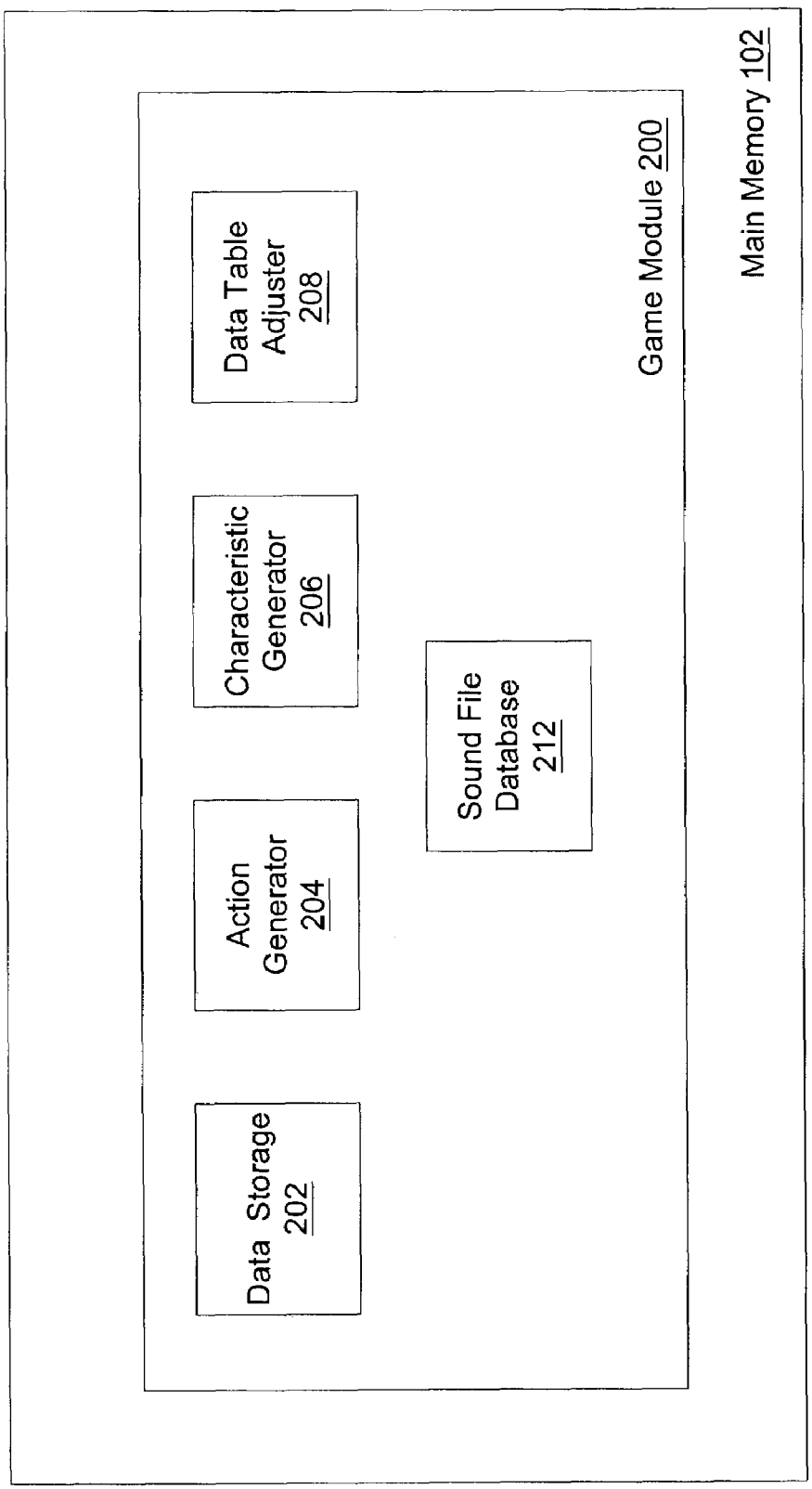
FIG. 2 is a block diagram of an exemplary embodiment of a main memory of FIG. 1 according to the present invention.

FIG. 2 is a block diagram of an exemplary embodiment of the main memory 102 of FIG. 1 according to the present invention. The main memory 102 is shown containing a game module 200 which is loaded into the main memory 102 from an optical disc in the optical disc control unit 126 (FIG. 1). The game module 200 contains instructions executable by the CPU 104, the vector unit 106, and the sound processing unit 124 of FIG. 1 that allows a user of the entertainment system 100 (FIG. 1) to play a game. In the exemplary embodiment of FIG. 2, the game module 200 includes data storage 202, an action generator 204, a characteristic generator 206, a data table adjuster 208, and a sound file database 212 containing one or more sound files (not shown).

In one embodiment, the action generator 204, the characteristic generator 206, and the data table adjuster 208 are software modules executable by the CPU 104. For example, the CPU 104 executes the action generator 204 to produce game play, including character motion and character response. In addition, the CPU 104 accesses data in data storage 202 as instructed by the action generator 204, the characteristic generator 206, and the data table adjuster 208. Furthermore, the CPU 104 executes the characteristic generator 206 to generate a character's expressions as displayed on a monitor (not shown), the CPU 104 executes the data table adjuster 208 to update data in data storage 202 during game play, and the CPU 104 processes a user selected sound file, for example, from the sound file database 212, to choreograph a video game sequence. The processing of the user selected sound file in connection with the data storage 202 is described further below in conjunction with FIGS. 3-7.

For the purposes of this exemplary embodiment, the game module 200 is a tribal simulation game in which a player creates and trains tribes of characters. However, the scope of the present invention covers any games in which characters simultaneously interact. Character interactions include, but are not necessarily limited to, individual and/or group fights, healing, retreats, and explorations, to name a few.

Figure 3:
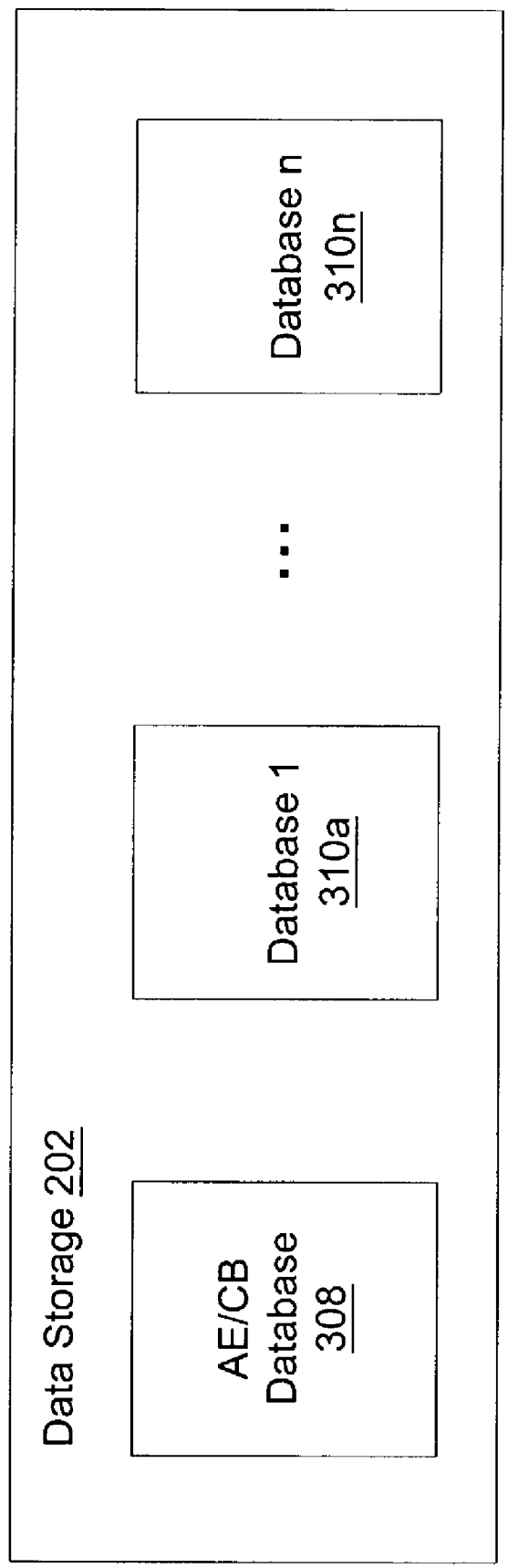
FIG. 3 is a block diagram of an exemplary embodiment of data storage of FIG. 2 according to the present invention.

FIG. 3 is a block diagram of an exemplary embodiment of data storage 202 of FIG. 2. Data storage 202 includes an action event/camera behavior (AE/CB) database 308. Data storage 202 may include other databases 310 as required by the game module 200. For example, database 310 may include characteristics associated with game characters, such as physical and emotional attributes. The AE/CB database 308 is described further below in conjunction with FIGS. 5-6.

In one embodiment of the invention, a user initiates game play via instructions communicated to the CPU 104 (FIG. 1) via the controller interface 114 (FIG. 1) and the I/O processor 110 (FIG. 1). A user may select the sound file from the sound file database 212 (FIG. 2) upon initiation of game play. In operation, the sound processing unit 124 (FIG. 1) processes the selected sound file, and sends the processed sound file to speakers (not shown) and to the CPU 104. In one embodiment of the invention, the sound file is a directors track. In another embodiment of the invention, the sound processing unit 124 processes the sound file to generate a directors track. An exemplary embodiment of the directors track is discussed further below in conjunction with FIG. 4A.

The CPU 104 analyzes the directors track for musical events. For example, musical events may be qualitatively associated with emotions experienced by game users as the selected sound file is played via the speakers (not shown). Musical events, as related to user-experienced emotions, may be defined, but not limited to, an accelerando (a gradually faster tempo), an addolorato (a sorrowful passage), an allegro (a cheerful passage), an agitato (a lively passage, with excitement), a crescendo (gradually louder), a decrescendo (gradually softer), or a fermata (a pause), among many others. As discussed further below in conjunction with FIGS. 4A-4B, characteristic points in the directors track may be associated with a variety of musical events.

Figure 4A:
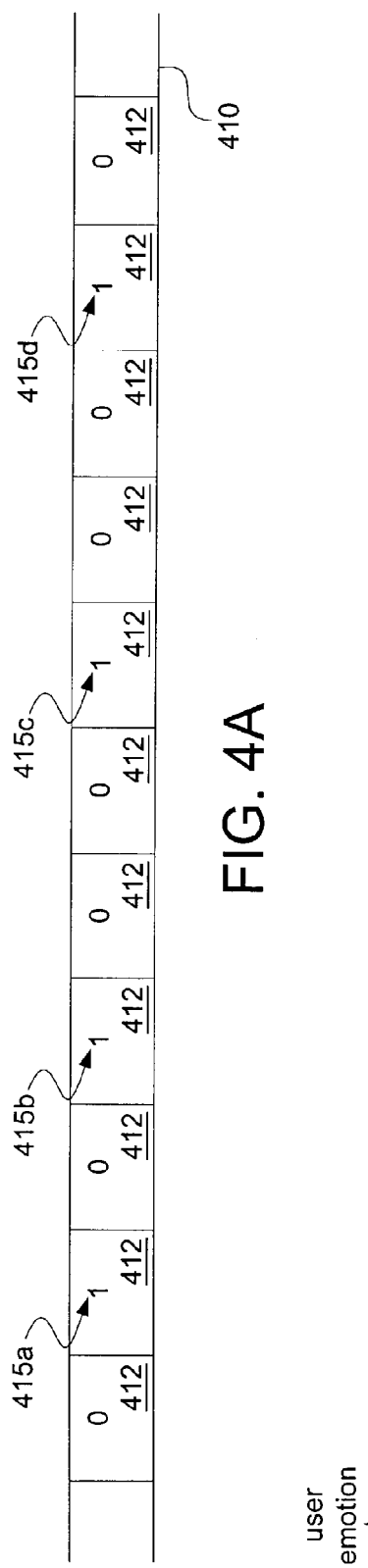
FIG. 4A illustrates an exemplary embodiment of a directors track according to the present invention.

FIG. 4A illustrates an exemplary embodiment of a directors track 410, according to the present invention. For example, sound processing unit 124 (FIG. 1) processes a user-selected sound file, where the user-selected sound file is the directors track 410. In an alternate embodiment of the invention, the sound processing unit 124 processes the user-selected sound file to generate the directors track 410. The directors track 410 may comprise a sequence of segments 412, where each segment 412 includes one or more bytes (not shown) representative of the music data stream. Furthermore, each segment 412 includes a marker bit 415 that is either "on" (a "1" state, also referred to as a "1" bit)

or "off" (a "0" state, also referred to as a "0" bit). The marker bit 415 may mark musical events associated with the sound file. According to the present invention, a marker bit value in a "1" state corresponds to a musical event. In an alternate embodiment of the invention, a marker bit in a "0" state may correspond to a musical event. In yet another embodiment of the invention, the marker bits 415 are embedded in the directors track 410 at regular intervals. For example, if the directors track 410 is five minutes in length, then the directors track 410 may be segmented into six hundred segments, where each segment is 0.5 seconds long.

The FIG. 4A exemplary embodiment of the directors track 410 shows four "on" marker bits (415*a*, 415*b*, 415*c*, 415*d*) corresponding to four musical events of the sound file. For example, each of the four musical events may correspond to an emotional feeling specified by the game module 200 (FIG. 2). The emotional feelings may include, but are not limited to, feelings of fear, rage, happiness, sympathy, and hope. The scope of the present invention includes any music-generated emotions experienced by game users. For example, the four "on" marker bits (415*a*, 415*b*, 415*c*, and 415*d*) may correspond to four musical events associated with four emotional feelings in a game user.

Figure 4B:
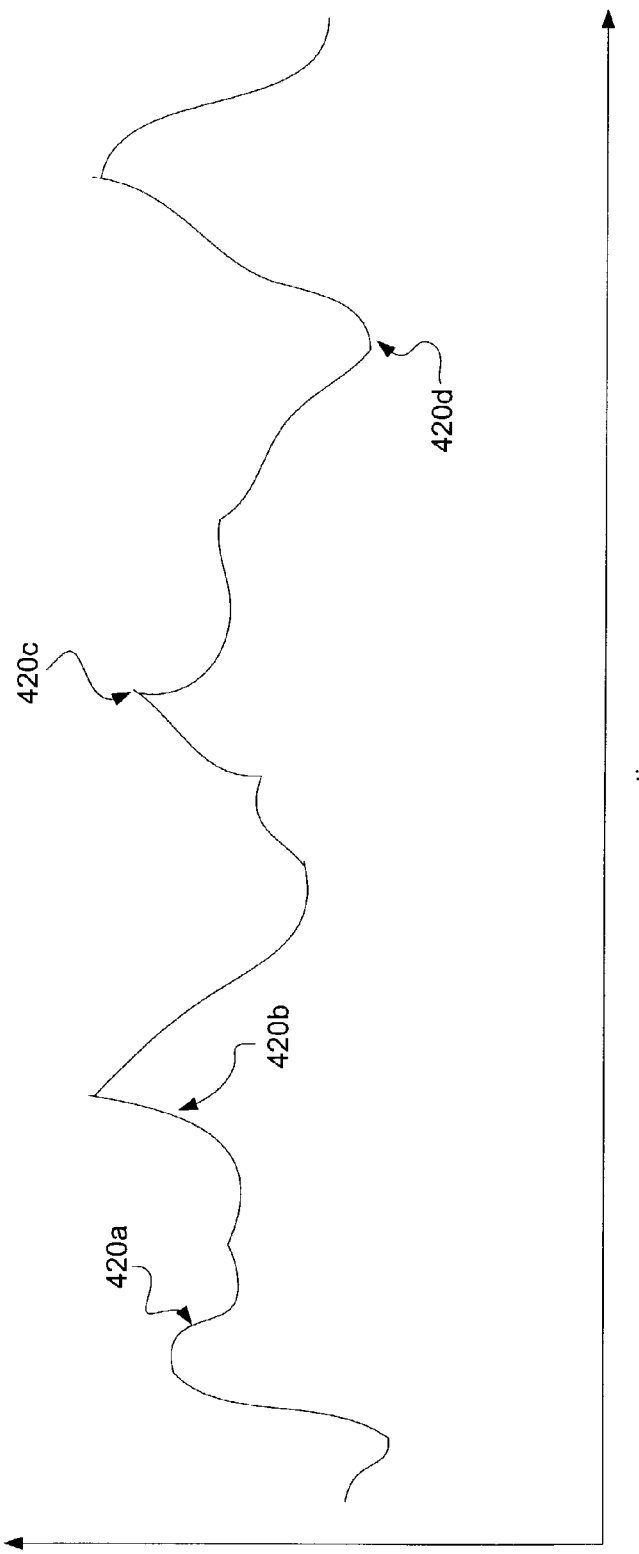
FIG. 4B is a graph of an emotional feeling of "fear" in a user, associated with the directors track of FIG. 4A, according to the present invention.

FIG. 4B is a graph of user emotion, corresponding to the FIG. 4A embodiment of the directors track 410, where a quantification of user emotion may be based upon results of processing, manipulating, or transforming data (i.e., the bytes) of the directors track 410. For example, the sound file may have a "accelerando" or a "crescendo" segment that is associated with an emotion of fear, or a "fermata" segment that is associated with an emotion of anxiety. Thus, in the FIG. 4A and FIG. 4B exemplary embodiments of the invention, the marker bit 415*a* associated with a first musical event 420*a* may correspond to user-felt "hope," the marker bit 415*b* associated with a second musical event 420*b* may correspond to user-felt "fear," the marker bit 415*c* associated with a third musical event 420*c* may correspond to user-felt "rage," and the marker bit 415*d* associated with a fourth musical event 420*d* may correspond to user-felt "anxiety." The marker bits 415 are set to an "on" state when different user-felt emotions are realized, as illustrated in the FIG. 4A and FIG. 4B exemplary embodiments of the invention. In another embodiment of the invention, the "on" marker bits 415 are located in the directors track 410 at regular set intervals, independent of the user-felt emotion at those set intervals.

In operation, the CPU 104 (FIG. 1) determines the state of the marker bits 415 in the directors track 410. When the CPU 104 detects a marker bit value of "1," such as the marker bit 415*a*, then the CPU 104 accesses the AE/CB database 308 (FIG. 3) to select an action event and a camera behavior associated with the given detected marker bit. In addition, the CPU 104 determines a location in the game world of the selected action event (referred to as an action location).

In the previously described embodiments of the invention, the directors track 410 includes preprogrammed marker bits set to "on" and "off" states to define musical events. However, in an alternate embodiment of the invention, the directors track 410 includes preprogrammed marker bits which define musical events. In this embodiment of the invention, when the CPU 104 detects each marker bit in the directors track 410, then the CPU 104 accesses the AE/CB database 308 to select an action event and a camera behavior associated with each detected marker bit. In another embodiment of the invention, the sound processing unit 124 (FIG. 1) or another module of the electronic entertainment system 100 processes a selected sound file, and embeds marker bits of given states into the directors track 410, dependent upon predefined music-emotion criteria.

Figure 5:
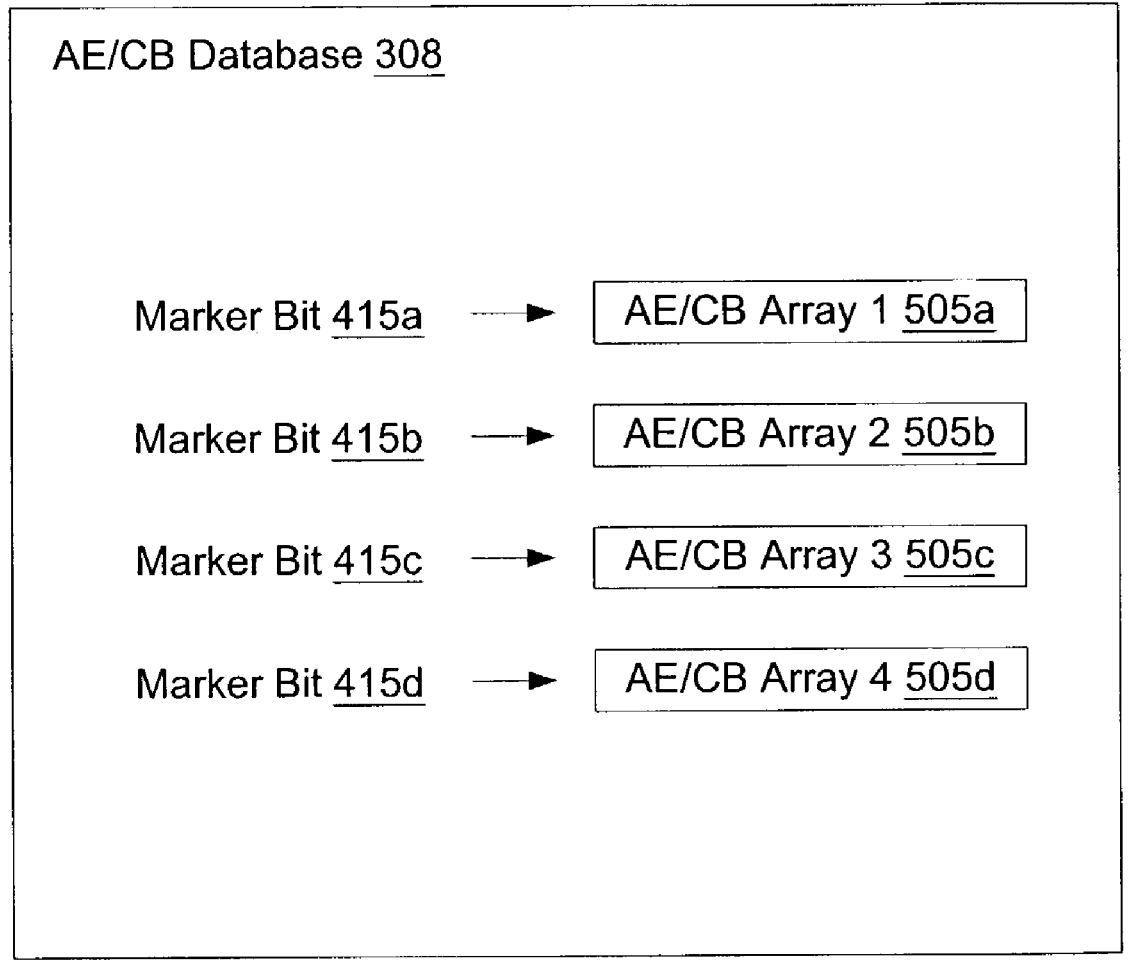
FIG. 5 is a block diagram of an exemplary embodiment of an AE/CB database of FIG. 3 according to the present invention.

FIG. 5 is a block diagram of an exemplary embodiment of the AE/CB database 308 of FIG. 3. FIG. 5 includes associations between the marker bits 415 and AE/CB arrays 505. For example, when the CPU 104 (FIG. 1) detects the marker bit 415*a* (i.e., the first "on" marker bit of directors track 410 of FIG. 4A) that corresponds to the first musical event 420*a* (FIG. 4B), the CPU 104 accesses AE/CB array 1 505*a*. When the CPU 104 detects the marker bit 415*b* (i.e., the second "on" marker bit of directors track 410) that corresponds to the second musical event 420*b*, the CPU 104 accesses the AE/CB array 2 505*b*. As discussed further below in conjunction with FIG. 6, the CPU 104 then selects an action event pointer and a camera behavior pointer from the accessed AE/CB array 505, and determines an action location. The action generator 204 (FIG. 2) then executes game instructions (located at the action event pointer) associated with the action event located at the action location in the game world, using camera behavior instructions located at the camera behavior pointer.

Figure 6:
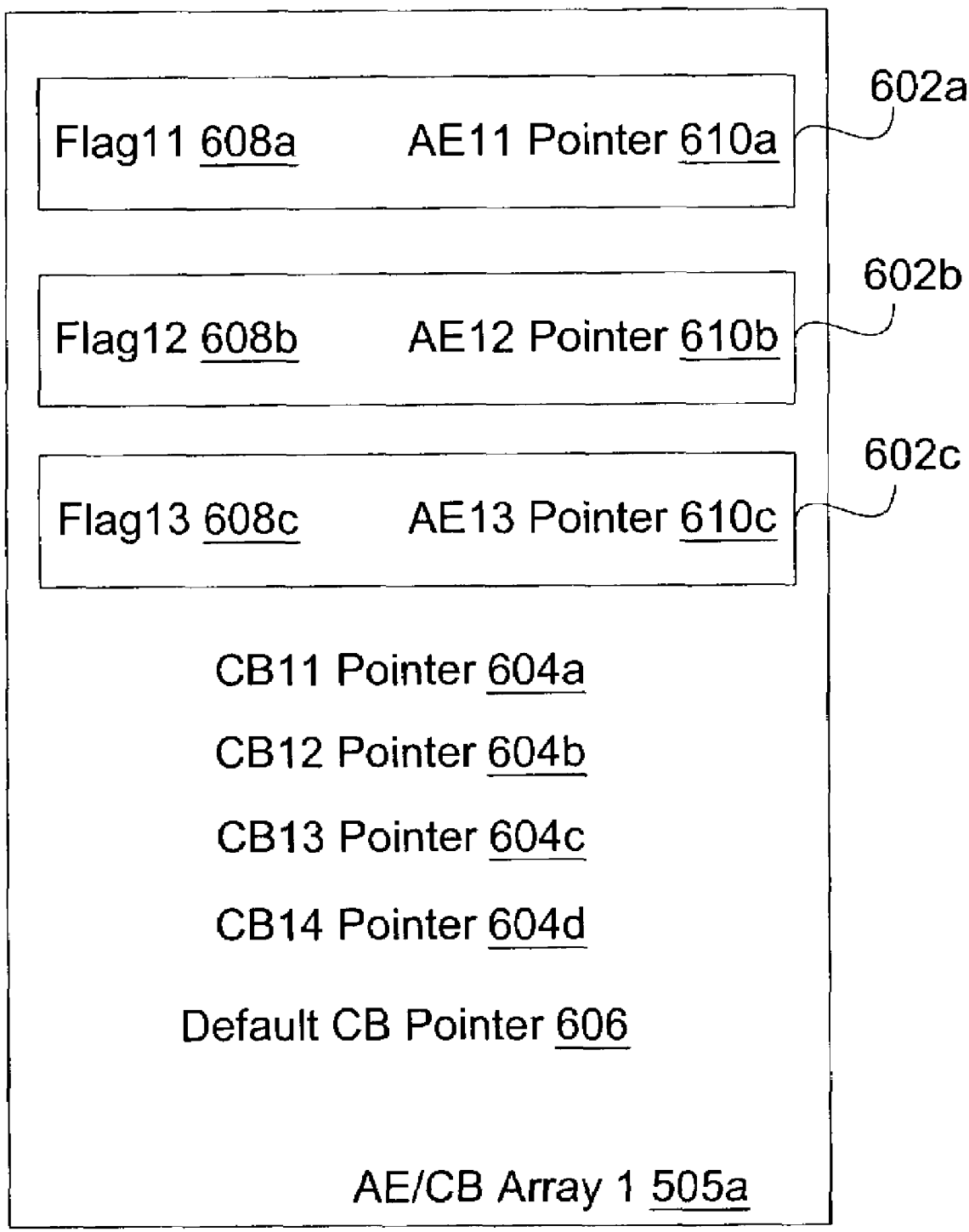
FIG. 6 is a block diagram of an exemplary embodiment of an AE/CB array of FIG. 5 according to the present invention.

FIG. 6 is a block diagram of an exemplary embodiment of the AE/CB array 1 505*a* of FIG. 5. The AE/CB array 1 505*a* includes action elements AE11 602*a*, AE12 602*b*, and AE13 602*c*; four camera behavior (CB) pointers CB11 pointer 604*a*, CB12 pointer 604*b*, CB13 pointer 604*c*, and CB14 pointer 604*d*; and a default CB pointer 606. Each action element 602 includes an action flag 608 and an AE pointer 610. For example, the action element AE11 602*a* includes an action flag11 608*a* and an associated AE11 pointer 610*a*, action element AE12 602*b* includes an action flag12 608*b* and an associated AE12 pointer 610*b*, and action element AE13 602*c* includes an action flag13 608*c* and an associated AE13 pointer 610*c*. The state of the action flag 608 indicates if an action event corresponding to the AE pointer 610 is currently active in the game. For example, if the state of action flag11 608*a* is "1," then the action event corresponding to the AE11 pointer 610*a* is currently active in game play. If the state of action flag11 608*a* is "0," then the action event corresponding to the AE11 pointer 610*a* is currently not active in game play.

The action flags 608 are dynamic variables. The action generator 204 (FIG. 2) updates the action flags 608 at regular time intervals during game play. For example, a first action event corresponding to the AE11 pointer 610*a* may be a fight between tribe 1 and tribe 2, a second action event corresponding to the AE12 pointer 610*b* may be a character 1 healing any other character, and a third action event corresponding to the AE13 pointer 610*c* may be a discovery of a significant game object or a special game character by tribe 3. When the first action event corresponding to the AE11 pointer 610*a* is active during game play, the action generator 204 sets the flag11 608*a* to "1." When the first action event corresponding to the AE11 pointer 610*a* is not active during game play, then the action generator 204 sets the flag11 608*a* to "0."

The AE pointer 610 of each action element 602 points to an location corresponding to the given action. In one embodiment of the invention, if the state of the action flag11 608*a* is "1" and the state of the action flags 608*b*-608*c* are "0," then the CPU 104 selects the action flag11 608*a*, and the action generator 204 then executes game instructions located at the AE11 pointer 610*a*. In another embodiment of the invention, if more than one action flag 608 has a state of "1," then the CPU 104 randomly selects one of the action flags 608 with the state of "1," and the action generator 204 then executes game instructions located at the AE pointer 610 corresponding to the selected action flag 608.

Once the CPU 104 has selected the action flag 608 and the corresponding AE pointer 610, the CPU 104 then determines the game world action location of the action event associated with the selected AE pointer 610. Subsequently, the CPU 104 determines a CB pointer 604 randomly. Each CB pointer 604 corresponds to a given camera behavior. Once the CPU 104 selects the CB pointer 604, the camera behavior corresponding to the selected CB pointer 604 is executed by the action generator 204. For example, when the CPU 104 selects the action flag11 608a, determines an action location corresponding to the action event associated with the AE11 pointer 610a, and selects the CB12 pointer 604b, then a user views the action event located at a game world location specified by the action location and associated with the AE11 pointer 610a, using a camera behavior associated with the CB12 pointer 604b.

The scope of the present invention includes any camera behavior. According to the present invention, camera behavior includes camera filters to generate color, black & white, and graininess effects; camera movements such as camera tilt, orbit, character and/or group tracking (e.g., group tracking of wounded characters); and camera special effects such as camera zoom, wide-angle, pan, blur, slow motion, and stop-time. The scope of the present invention includes other types of camera behaviors as well, such as a camera view from a perspective of a given character directed at another given character.

For example, the CB11 pointer 604a may be associated with a camera positioned horizontally that orbits a point in a 360 degree ring located at ground level. The CB12 pointer 604b may be associated with stop-time as the camera circles the point in a 360 degree ring located at ground level. The CB13 pointer 604c may be associated with a camera that circles the point in a ring elevated above the ground and centered about a point. Finally, the camera behavior associated with the CB14 pointer 604d may be similar to the camera behavior associated with the CB13 pointer 604c, but the rotation speed may have a different value. Since for each action event selected by the CPU 104, the CPU 104 randomly chooses a camera behavior, it is unlikely that a given musical event will result in a display of the same action event with the same camera behavior each time the musical event occurs.

In another embodiment of the invention, if no action flags 608 are "on" for a given musical event 420, then the CPU 104 chooses the default CB pointer 606 to view the current action event. In another embodiment of the invention, the default CB pointer 606 is not enabled, and if no action flags 608 are "on" for a given musical event 420, then the CPU 104 randomly chooses a CB pointer, for example, the CB pointer 604c, to view the current action event.

Figure 7:
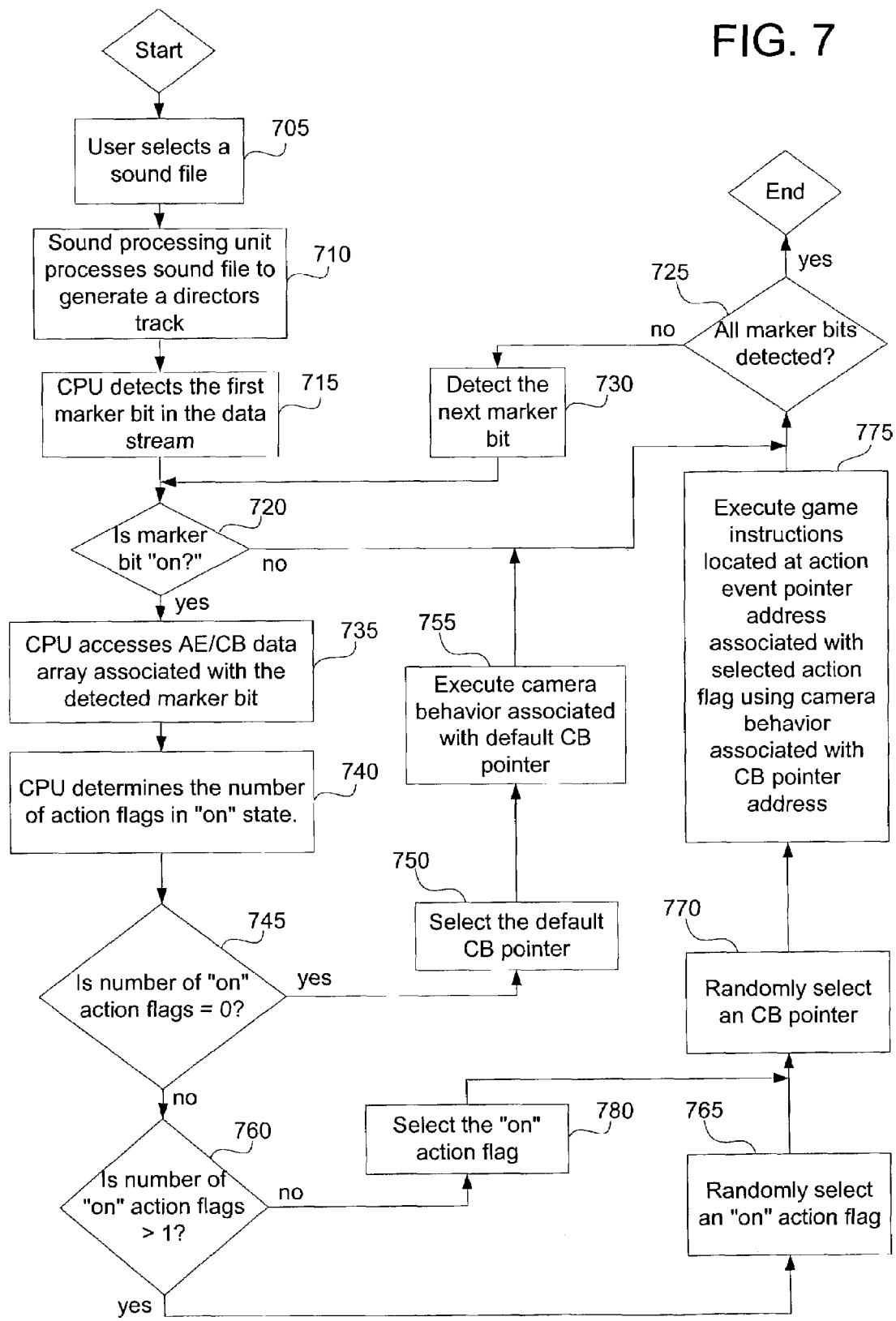
FIG. 7 is a flowchart of method steps for video game choreography based upon a user selected sound file according to one embodiment of the present invention.

FIG. 7 is a flowchart of method steps for video game choreography based upon a user selected sound file according to one embodiment of the invention. In step 705, a video game user selects a sound file upon video game initialization. In step 710, the sound processing unit 124 (FIG. 1) of the electronic entertainment system 100 (FIG. 1) processes the sound file. In a preferred embodiment of the invention, the sound file is the directors track 410 (FIG. 4A). The sound processing unit 124 sends the directors track 410 to the CPU 104. Subsequently, the CPU 104 processes the directors track 410 and detects a first marker bit of the directors track 410 in step 715. In step 720, the CPU 104 determines the state of the detected marker bit. If the CPU 104 discovers that the detected marker bit is in an "off" state, then in step 725, the CPU 104 computes whether all the marker bits of the directors track 410 have been detected. If all the marker bits have been detected, then the method is completed. If, in step 725, the CPU 104 determines that all the marker bits have not been detected, then in step 730, the CPU 104 detects the next marker bit. The method then continues at step 720.

If, in step 720, the CPU 104 ascertains that the detected marker bit is in an "on" state, then in a step 735, the CPU 104 accesses the AE/CB array 505 associated with the detected marker bit. The CPU 104 then computes the number of action flags in the AE/CB array 505 (FIG. 5) that are "on" in step 740. Separately, in step 745, if the CPU 104 determines that the number of "on" action flags are zero, then in step 750, the CPU 104 selects the default CB pointer 606 (FIG. 6). The action generator 204 (FIG. 2) executes the camera behavior located by the default CB pointer 606 in step 755, and the method then continues at step 725.

Referring back to step 745, if the CPU 104 ascertains that the number of "on" action flags is not equal to zero, then in step 760, the CPU 104 determines if the number of "on" action flags is greater than one. If the number of "on" action flags is greater than one, then in step 765, the CPU 104 randomly selects an action flag 608 (FIG. 6) from the plurality of "on" action flags 608. Each action flag 608 is associated with an action event pointer 610 (FIG. 6). In addition, the CPU 104 determines an action location associated with the action event pointer 610. Next, in step 770, the CPU 104 randomly selects a CB pointer 604 (FIG. 6) from the CB pointers 604 stored in the AE/CB data array 505 associated with the detected marker bit. In step 775, the action generator 204 executes game instructions located by the action event pointer 610 associated with the selected action flag 608' using camera behavior instructions located by the selected CB pointer 604. The method then continues at step 725.

Referring back to step 760, if the CPU 104 discovers that the number of "on" action flags is not greater than one, then in step 780, the CPU 104 selects the "on" action flag. The method then continues at step 770. It should be noted that FIG. 7 illustrates one exemplary embodiment of a method according to the present invention. Alternatively, the method may be practiced with more or less steps and in a different order.

The invention has been described above with reference to specific embodiments. It will, however, be evident that various modifications and changes may be made thereto without departing from the broader spirit and scope of the invention. For example, the present invention may be used in video generation other than in a gaming environment. The foregoing description and drawings are, accordingly, to be regarded in an illustrative rather than a restrictive sense.

What is claimed is:

1. A method for creating an entertaining video sequence based upon video sound file data, comprising the steps of:
   processing the sound file data to detect marker bits, wherein each detected marker bit is associated with at least one action event and at least one camera behavior;
   selecting an action event for each detected marker bit, wherein selecting an action event for each detected marker bit comprises randomly selecting an action event from a subset of the at least one action event that corresponds to active action events to give the video sequence randomness;
   selecting a camera behavior for the selected action event; and executing the camera behavior to view the selected action event.

2. The method of claim 1, further comprising the step of determining an action location for the selected action event.

3. The method of claim 1, wherein the step of processing the sound file data to detect marker bits further comprises the step of detecting marker bits in an 'on' state.

4. The method of claim 1, wherein each detected marker bit marks a location in the sound file data of a musical event.

5. The method of claim 4, wherein the musical event is an emotionally critical musical event.

6. The method of claim 1, wherein the action event is an interaction between at least two characters.

7. The method of claim 1, wherein the action event is an interaction between a character and an environment about the character.

8. The method of claim 1, wherein the camera behavior is application of a camera filter.

9. The method of daim 1, wherein the camera behavior is a camera movement.

10. The method of claim 1, wherein the camera behavior is application of a camera special effect.

11. A computer-readable storage medium having embodied thereon a program, the program being executable by a computer to perform method steps for creating an entertaining video sequence based upon video sound file data, the method steps comprising:
 processing the sound file data to detect marker bits, wherein each detected marker bit is associated with at least one action event and at least one camera behavior;
 selecting an action event for each detected marker bit, wherein selecting an action event for each detected marker bit comprises randomly selecting an action event from a subset of the at least one action event that corresponds to active action events to give the video sequence randomness;
 selecting a camera behavior for the selected action event; and
 executing the camera behavior to view the selected action event.

12. The computer-readable storage medium of claim 11, further comprising the step of determining an action location for the selected action event.

13. The computer-readable storage medium of claim 11, wherein each detected marker bit marks a location in the sound file data of a musical event.

14. An electronic system for creating an entertaining video sequence based upon a video sound file, comprising:
 a memory configured to store an action event/camera behavior (AE/CB) database and one or more director tracks;
 a sound processing unit coupled to the memory for processing a directors track selected from the one or more director tracks; and
 a processor coupled to the memory and the sound processing unit, the processor configured to execute the selected directors track to detect marker bits, and to access the AE/CB database to select an AE and a CB.

15. The electronic system of claim 14, wherein each detected marker bits a '1' bit.

16. The electronic system of claim 14, wherein each detected marker bit marks a musical event, and is associated with an AE/CB array in the AE/CB database.

17. The electronic system of claim 16, wherein the musical event is a emotionally critical musical event.

18. The electronic system of claim 16, wherein each AE/CB array includes one or more action flag/AE pointer pairs, and one or more CB pointers.

19. The electronic system of claim 18, wherein the memory is further configured to store an action generator, the action generator executable by the processor for generating actions and for activating each action flag of the one or more action flag/AE pointer pairs if an action event associated with each action flag is active.

20. The electronic system of claim 19, wherein the processor randomly selects one AE pointer from the one or more activated action flag/AE pointer pairs.

21. The electronic system of claim 18, wherein the processor randomly selects one CB pointer from the one or more CB pointers.

22. The electronic system of claim 18, wherein the processor executes an action generator to view an action event corresponding to a selected AE pointer with a camera behavior corresponding to a selected CB pointer.

23. A method for creating an entertaining video sequence based upon video sound file data, comprising the steps of:
 processing the sound file data to detect marker bits;
 determining a state of each detected marker bit;
 accessing an action event/camera behavior (AE/CB) array for each marker bit in a '1' state;
 selecting an action event from the accessed AE/CB array;
 selecting a camera behavior from the accessed AE/CB array;
 determining an action location for the selected action event; and
 executing the selected camera behavior to view the selected action event at the action location.

24. A system for creating an entertaining video sequence based upon video sound file data, comprising:
 means for processing the sound file data to detect marker bits, wherein each detected marker bit is associated with at least one action event and at least one camera behavior;
 means for selecting an action event for each detected marker bit,wherein selecting an action event for each detected marker bit comprises randomly selecting an action event from a subset of the at least one action event that corresponds to active action events to give the video sequence randomness;
 means for selecting a camera behavior for the selected action event; and
 means for executing the camera behavior to view the selected action event.

* * * * *